United States Patent
Heo

(10) Patent No.: US 9,263,774 B2
(45) Date of Patent: Feb. 16, 2016

(54) METAL TAB AND SECONDARY BATTERY USING THE SAME

(75) Inventor: Sang-Do Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 877 days.

(21) Appl. No.: 12/963,449

(22) Filed: Dec. 8, 2010

(65) Prior Publication Data

US 2011/0151288 A1   Jun. 23, 2011

(30) Foreign Application Priority Data

Dec. 22, 2009   (KR) .................. 10-2009-0128888

(51) Int. Cl.
*H01M 2/00* (2006.01)
*H01M 10/42* (2006.01)
*H01M 2/04* (2006.01)

(52) U.S. Cl.
CPC .......... *H01M 10/425* (2013.01); *H01M 2/0469* (2013.01); *H01M 2200/00* (2013.01)

(58) Field of Classification Search
USPC ............................................ 429/7
See application file for complete search history.

(56) References Cited

U.S. PATENT DOCUMENTS

| 6,524,732 B1* | 2/2003 | Iwaizono et al. ............ 429/7 |
| 2007/0009787 A1* | 1/2007 | Straubel et al. ............ 429/99 |
| 2009/0098418 A1* | 4/2009 | Byun et al. ............ 429/7 |

FOREIGN PATENT DOCUMENTS

| JP | 2006-004837 | 1/2006 |
| KR | 2001-0056041 A | 7/2001 |
| KR | 10-2006-0012810 A | 2/2006 |
| KR | 10-2006-0046292 A | 5/2006 |
| KR | 10-2007-0033834 A | 3/2007 |
| KR | 10-2009-0050179 A | 5/2009 |

OTHER PUBLICATIONS

KIPO Office action dated May 23, 2011, in priority Application No. 10-2009-0128888, 1 sheet.

* cited by examiner

*Primary Examiner* — Maria J Laios
(74) *Attorney, Agent, or Firm* — Lewis Roca Rothgerber Christie LLP

(57) ABSTRACT

A secondary battery and a manufacturing method thereof, the secondary battery including a bare cell having an electrode terminal connected thereto; a protection circuit board (PCB) substrate; and a metal tab to connect the PCB substrate to the electrode terminal, disposed in an accommodating groove of the PCP substrate. The metal tab includes wing portions laid across the accommodating groove, a terminal contact portion that comes in contact with the electrode terminal, and curved portions disposed between the terminal contact portion and the wing portions.

13 Claims, 3 Drawing Sheets

METAL TAB AND SECONDARY BATTERY USING THE SAME

CROSS-REFERENCE TO RELATED APPLICATION

This application claims the benefit of Korean Patent Application No. 10-2009-0128888, filed on Dec. 22, 2009, in the Korean Intellectual Property Office, the disclosure of which is incorporated herein, by reference.

BACKGROUND

1. Field

An aspect of the present disclosure relates to a metal tab and a secondary battery including the same.

2. Description of the Related Art

In general, secondary batteries are rechargeable batteries that can be manufactured in a compact size or a large size. As portable wireless devices, such as mobile phones, PDAs, and notebook computers have become smaller and more functional, many studies have recently been conducted to develop secondary batteries for such portable wireless devices.

A secondary battery includes a bare cell, a protection circuit board, and a connection tab electrically connecting the protection circuit board to an electrode terminal of the bare cell. However, during the manufacturing the protection circuit board, the electrode terminal and the connection tab may not be closely adhered to each other by welding, due to fabrication errors, and therefore, a contact failure may occur.

SUMMARY

In one exemplary embodiment, there is provided a secondary battery and a manufacturing method thereof, in which a welding failure between an electrode terminal and a metal tab does not occur, so that the electrode terminal and the metal tab are not easily separated from each other, by an external impact.

In another exemplary embodiment, there is provided a secondary battery and a manufacturing method thereof, in which a metal tab is prevented from coming off from an upper portion of a protection circuit module, during the welding of an electrode terminal and the metal tab, so that a bare cell and the protection circuit module can be firmly connected to each other.

According to an aspect of the present disclosure, there is provided a metal tab connected to an electrode terminal of a bare cell, through an accommodating groove formed in a protection circuit board (PCB) substrate, the metal tab including a terminal contact portion connected to the electrode terminal; sidewalls vertically extended from the terminal contact portion, along the inner walls of the accommodating groove; wing portions respectively extended from the sidewalls, which are seated on the upper surface of the PCB substrate; and bent portions formed to protrude upward along the boundary between the sidewalls and the wing portions.

According to various embodiments, the bent portions have a rounded shape.

According to various embodiments, the metal tab may be formed into a single body.

According to various embodiments, notches may be formed where the terminal contact portion contacts the sidewalls.

According to various embodiments, the notches may be respectively formed at positions opposite to each other, with the terminal contact portion interposed therebetween.

According to various embodiments, the notches may be formed through a punching process.

According to various embodiments, the notches may be formed throughout the terminal contact portion and the sidewalls.

According to another aspect of the present disclosure, there is provided a secondary battery including: a bare cell having an electrode terminal formed at one end thereof; a PCB substrate having an accommodating groove corresponding to the position of the electrode terminal, the PCB substrate being electrically connected to the bare cell; and a metal tab connecting the PCB substrate to the electrode terminal, through the accommodating groove. The metal tab includes: a terminal contact portion connected to the electrode terminal; sidewalls vertically extended along the inner wall of the accommodating groove, from the terminal contact portion; wing portions respectively extended from the sidewalls, seated on the upper surface of the PCB substrate; and bent portions formed to protrude upward along the boundaries between the sidewalls and the wing portions. The bent portions are formed so that the sidewalls are extended, as the bent portions are deformed, during press welding of the terminal contact portion to the electrode terminal of the bare cell.

According to various embodiments, the bent portions may be formed to protrude in a rounded shape and then deformed so that the sidewalls are extended.

According to various embodiments, the metal tab may be formed into a single body.

According to various embodiments, notches may be formed in a region at which the terminal contact portion comes in contact with the sidewalls.

According to various embodiments, the notches may be respectively formed at positions opposite to each other, with the terminal contact portion interposed therebetween.

According to various embodiments, the notches may be formed through a punching process.

According to various embodiments, the notches may be formed throughout the terminal contact portion and the sidewalls.

In a secondary battery and a manufacturing method thereof, according to various embodiments, a welding failure between a metal tab and an electrode terminal does not occur. Accordingly, the metal tab and the electrode terminal are not easily separated from each other, by an external impact. Further, the metal tab is prevented from coming off from a PCB substrate, so that the PCB substrate and a bare cell can be firmly connected to each other.

Additional aspects and/or advantages of the present disclosure will be set forth in part in the description which follows and, in part, will be obvious from the description, or may be learned by practice of the present disclosure.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which.

DETAILED DESCRIPTION

Figure 1:
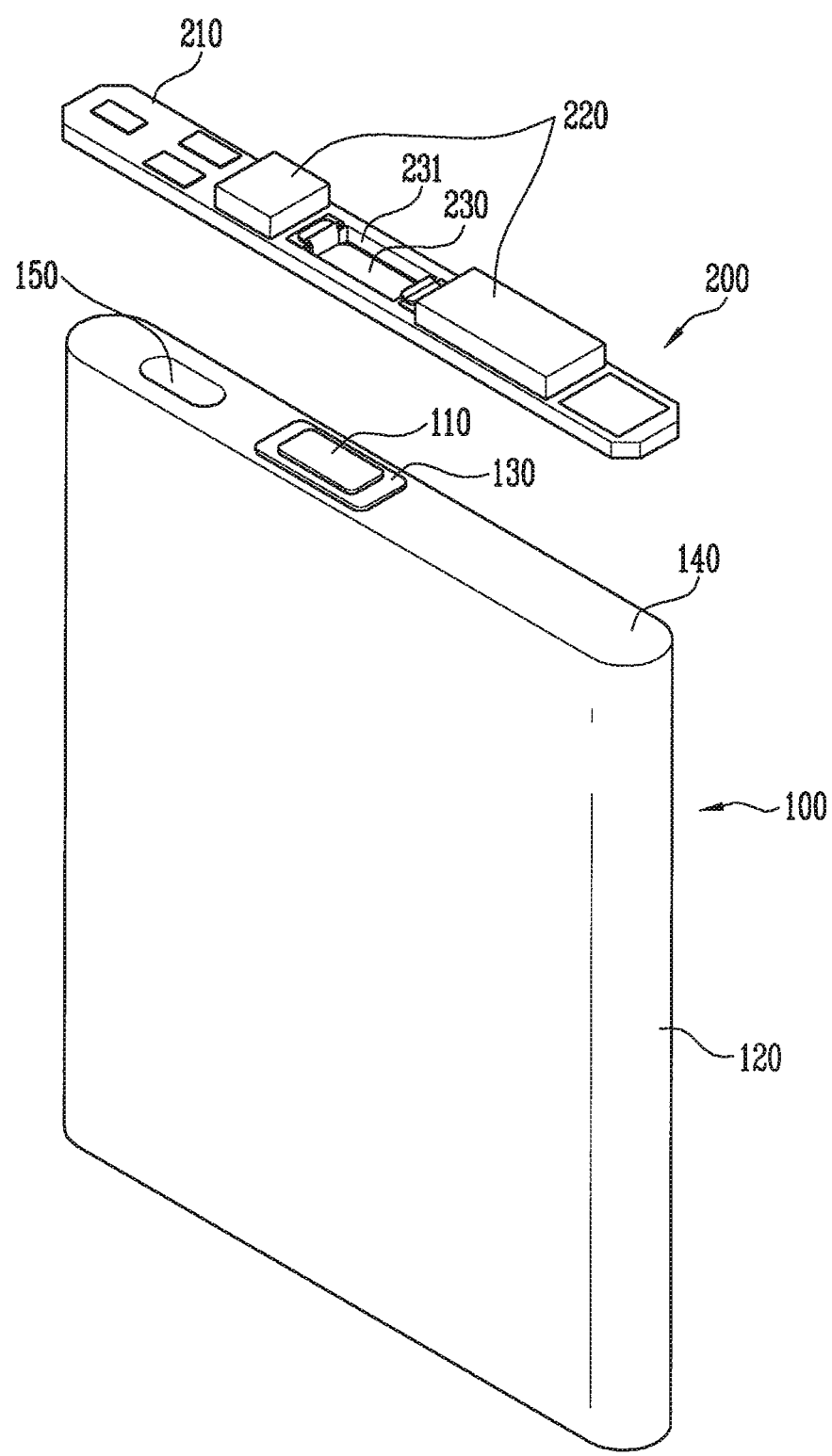
FIG. 1 is a perspective view of a secondary battery, according to an exemplary embodiment of the present disclosure.

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

In addition, when an element is referred to as being "on" another element, it can be directly on another element or be indirectly on the other element, with one or more intervening elements interposed therebetween. Also, when an element is referred to as being "connected to" another element, it can be directly connected to another element or be indirectly connected to the other element, with one or more intervening elements interposed therebetween.

FIG. 1 is a perspective view of a secondary battery, according to an exemplary embodiment of the present disclosure. Referring to FIG. 1, the secondary battery 50 includes a bare cell 100 and a protection circuit module 200.

The bare cell 100 includes an electrode assembly (not shown) and a metal can 120. The electrode assembly is formed by stacking a positive electrode plate, a separator, and a negative electrode plate. The charging/discharging of the electrode assembly is performed through positive and negative electrode terminals respectively connected to the positive and negative electrode plates. The electrode assembly is mounted, together with an electrolyte, in the metal can 120, The metal can 120 is connected to one of the positive and negative electrode plates of the electrode assembly, so as to have a positive or negative polarity. A can plate 140 is formed at the top of the metal can 120, so that an electrode terminal 110 having an opposite polarity to the metal can 120 can be exposed. An insulating layer 130 is formed between the can plate 140 and the electrode terminal 110, so that the can plate 140 and the electrode terminal 110 are isolated from each other. An electrolyte injection hole 150 is formed in the can plate 140, through which the electrolyte is injected. After the injection of the electrolyte is finished, the electrolyte injection hole 150 is covered by a stopper or the like, so as to prevent the electrolyte from being discharged from the metal can 120.

The protection circuit module 200 includes a printed circuit board (PCB) substrate 210, a protection circuit 220, and a metal tab 230. The protection circuit 220 is formed on the PCB substrate 210. The metal tab 230 is inserted into an accommodating groove 231 formed in the PCB substrate 210, so as to come in contact with the electrode terminal 110, which is exposed through the can plate 140. The protection circuit module 200 operates to prevent the overcharging and overdischarging of the bare cell 100. The protection circuit module 200 is formed by attaching a plurality of semiconductor elements to the protection circuit 220. The metal tab 230 may be formed of a metal, such as nickel or the like.

The secondary battery is shown in FIG. 1 as being a prismatic-type secondary battery. However, the secondary battery may be a pouch-type secondary battery, according to some aspects.

Figure 2A:
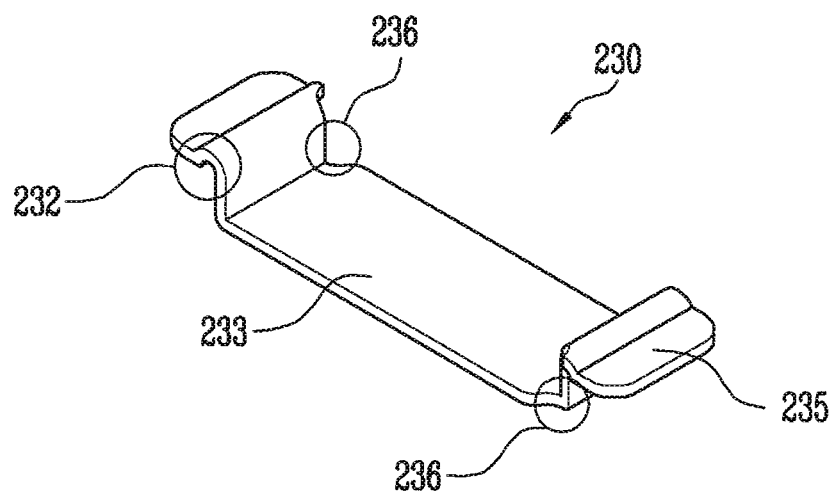
FIG. 2A is a perspective view illustrating the structure of a metal tab employed in the secondary battery of FIG. 1.
Figure 2B:
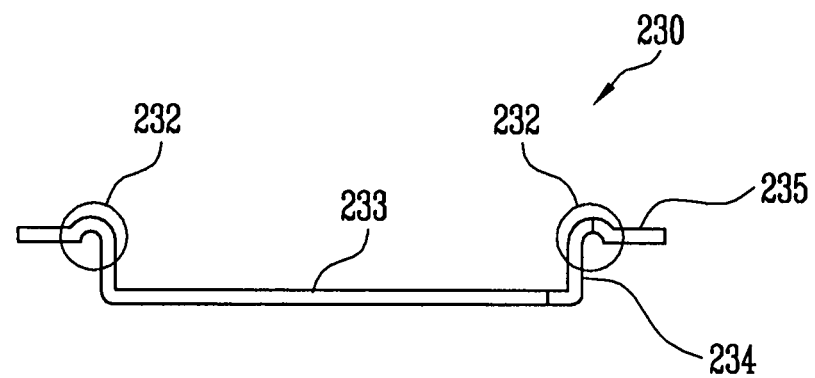
FIG. 2B is a plan view illustrating the structure of the metal tab.

FIG. 2A is a perspective view illustrating the structure of the metal tab 230. FIG. 2B is a plan view illustrating the structure of the metal tab 230. Referring to FIGS. 2A and 2B, the metal tab 230 includes: a terminal contact portion 233 that comes into contact with the electrode terminal 110, through the accommodating groove 231 of the protection circuit module 200; sidewalls 234 extending vertically from the terminal contact portion 233, along the inner walls of the accommodating groove 231; and wing portions 235 extending horizontally from the sidewalls 234, so as to be seated on the upper surface of the PCB substrate 210.

Both of the wing portions 235 are bent into a wing shape and positioned around the accommodating groove 231, so that the wing portions 235 do not pass through the accommodating groove 231. Bent portions 232 are formed between the wing portions 235 and the sidewalls 234. The bent portions 232 are not bent at a right angle. Instead, the bent portions 232 are curved. The bent portions 232 are bent upward between the wing portions 235 and the sidewalls 234, so as to facilitate the welding of the metal tab 230. In other words, the bent portions 232 extend vertically away from the terminal contact portion 233, so as to protrude above the planes of the sidewalls 234. The bent portions 232 are partially unbent, so as to lengthen the sidewalls 234 of the metal tab 230, when the terminal contact portion 233 is brought into contact with the electrode terminal 110, during welding.

When the welding is performed as described above, it is less likely that the wing portions 235 will be separated or detached from the upper portion of the PCB substrate 210. In particular, the curvature of the bent portions 232 compensates for non-uniformities of the electrode terminal 110 and/or the PCB substrate 210. This is because a sufficient length for the welding of the metal tab 230 is secured by the extension (partial unbending) of the bent portions 232.

Notches 236 are formed between the sidewalls 234 and the terminal contact portions 233 of the metal tab 230. Two notches 236 are shown to be formed in the metal tab 230, in a diagonal orientation. However, four notches 236 may be formed, according to some aspects. The notches 236 are formed by a punching process. The notches 236 may be formed at any one of the sidewalls 234 and the terminal contact portion 233, or may be formed throughout the sidewalls 234 and the terminal contact portion. The notches 236 are formed as described above, so that the extension (partial unbending) of the metal tab 230 can be smoothly performed, during the welding. In the metal tab 230, the terminal contact portion 233, the wing portions 235, and the sidewalls 234 may be formed as a single body.

Figure 3A:
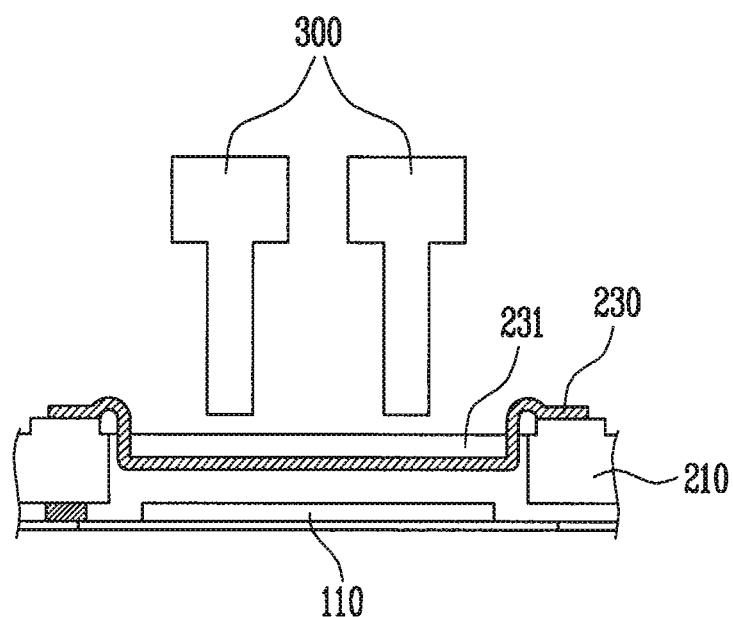
FIG. 3A is a view illustrating the state before resistance-welding the metal tab.
Figure 3B:
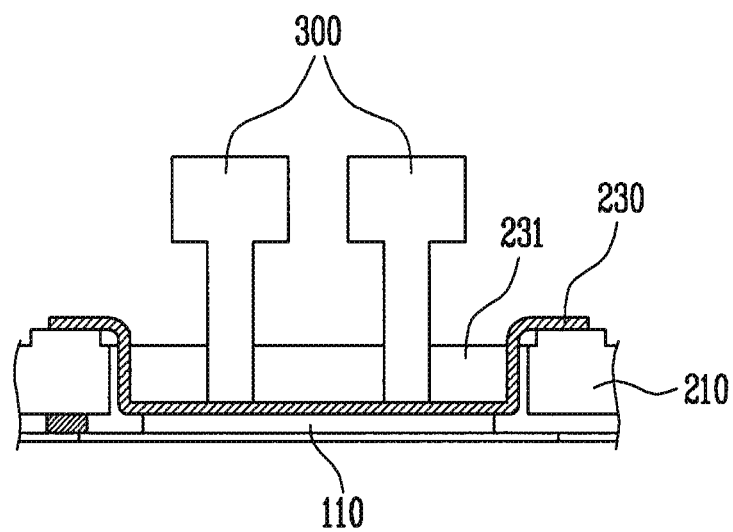
FIG. 3B is a view illustrating the state after resistance-welding the metal tab.

FIG. 3A is a view illustrating the metal tab 230, before the metal tab 230 is resistance welded to the secondary battery. FIG. 3B is a view illustrating the metal tab 230, after the metal tab 230 is resistance welded to the secondary battery.

As illustrated in FIG. 3A, if the metal tab 230 is inserted into the accommodating groove 231 of the PCB substrate 210, the terminal contact portion 233 is spaced apart from the electrode terminal 110, at a predetermined interval. Once in this state, the resistance welding is then performed. During the resistance welding, a predetermined pressure is applied to the terminal contact portion 233, using resistance welding rods 300, so that the metal tab 230 comes into contact with the electrode terminal 110, as illustrated in FIG. 3B. When heat is applied through the resistance welding rods 300, the metal tab is fixed to the electrode terminal 110. When the thickness of the protection circuit module 200 is not uniform, due to a fabrication error or the like, or when the electrode terminal 110 is not formed parallel on the can plate 140, the terminal contact portion 233 of the metal tab 230 does not easily come into contact with the electrode terminal 110. If the welding is performed in this state, a welding failure may occur, between the nickel tab and the electrode terminal.

However, if curved surfaces are formed between the wing portions 235 and the sidewalls 234, the terminal contact portion 233 can easily come into contact with the electrode terminal 110, when the pressure is applied to the terminal contact portion 233 by the resistance welding rods 300. Even if the thickness of the protection circuit module 200 is not uniform, the curved surfaces compensate for the varying thickness of the of the protection circuit module 200, by straightening to different degrees. The formation of the bent portions 232 results in the bent portions having less rigidity than other portions of the metal tab 230. Thus, the bent portions 232 can be more easily bent than other portions of the metal tab 230. Accordingly, the terminal contact portion 233 can easily come into contact with the electrode terminal 110, by the partial unbending of the bent portions 232.

Although a few exemplary embodiments of the present disclosure have been shown and described, it would be appreciated by those skilled in the art that changes may be made in these exemplary embodiments, without departing from the principles and spirit of the disclosure, the scope of which is defined in the claims and their equivalents.

What is claimed is:

1. A metal tab connected to an electrode terminal of a bare cell through an accommodating groove formed in a protection circuit board (PCB) substrate, the metal tab comprising:
   a terminal contact portion connected to the electrode terminal, extending in a first direction and inserted into the accommodating groove;
   sidewalls extending from opposing sides of the terminal contact portion, in a second direction that is substantially perpendicular to the first direction;
   wing portions extending outward from the sidewalls, in the first direction, so as to be seated on the upper surface of the PCB substrate, portions of the wing portions contacting the PCB substrate having widths greater than the sidewalls; and
   bent portions disposed between the sidewalls and the wing portions, the bent portions being curved, so as to protrude away from the terminal contact portion, above the wing portions,
   wherein the metal tab includes notches formed where the terminal contact portions contact the sidewalls.

2. The metal tab according to claim 1, wherein the bent portions have a rounded shape.

3. The metal tab according to claim 1, wherein the metal tab is formed as a single body.

4. The metal tab according to claim 1, wherein the notches face one another, across the terminal contact portion.

5. The metal tab according to claim 1, wherein the notches are formed by a punching process.

6. The metal tab according to claim 1, wherein the notches are formed throughout the terminal contact portion and the sidewalls.

7. A secondary battery comprising:
   a bare cell having an electrode terminal formed at one end thereof;
   a protection circuit board (PCB) substrate having an accommodating groove exposing the electrode terminal; and
   a metal tab disposed in the accommodating groove, connecting the PCB substrate to the electrode terminal, the metal tab comprising:
      a terminal contact portion connected to the electrode terminal, extending in a substantially horizontal plane and inserted into the accommodating groove;
      sidewalls extending from opposing sides of the terminal contact portion, in a first direction;
      wing portions extending outward from the sidewalls, in a second direction that is substantially perpendicular to the first direction, so as to be seated on the upper surface of the PCB substrate, portions of the wing portions contacting the PCB substrate having widths greater than the sidewalls; and
      bent portions disposed between the sidewalls and the wing portions, formed so as to increase the distance between the wing portions and the terminal contact portion, by being deformed when the terminal contact portion is press welded to the electrode terminal,
      wherein the bent portions protrude above the wing portions, and
      wherein the metal tab includes notches formed where the terminal contact portion contacts the sidewalls.

8. The secondary battery according to claim 7, wherein the bent portions are rounded, so as to protrude away from the terminal contact portion, above the sidewalls.

9. The secondary battery according to claim 7, wherein the metal tab is formed as a single body.

10. The secondary battery according to claim 7, wherein the notches face one another, across the terminal contact portion.

11. The secondary battery according to claim 7, wherein the notches are formed by a punching process.

12. The secondary battery according to claim 7, wherein the notches are formed throughout the terminal contact portion and the sidewalls.

13. A secondary battery comprising:
   a bare cell having an electrode terminal formed at one end thereof;
   a protection circuit board (PCB) substrate having an accommodating groove exposing the electrode terminal; and
   a metal tab disposed in the accommodating groove, connecting the PCB substrate to the electrode terminal, the metal tab comprising:
      a terminal contact portion connected to the electrode terminal, extending in a first direction and inserted into the accommodating groove;
      sidewalls extending from opposing sides of the terminal contact portion, in a second direction that is substantially perpendicular to the first direction;
      wing portions extending outward from the sidewalls, in the first direction, so as to be seated on the upper surface of the PCB substrate, portions of the wing portions contacting the PCB substrate having widths greater than the sidewalls; and
      bent portions disposed between the sidewalls and the wing portions, the bent portions being curved, so as to protrude away from the terminal contact portion, above the wing portions,
   wherein a portion of each of the bent portions is unbent, when the terminal contact portion is welded to the electrode terminal,
   wherein the metal tab includes notches formed where the terminal contact portion contacts the sidewalls.

* * * * *